United States Patent [19]

Schindler

[11] 4,225,777
[45] Sep. 30, 1980

[54] MULTIPLE VARIABLE PHASE CONTROL CIRCUIT

[76] Inventor: Mark Schindler, 835 N. Kings Rd., Los Angeles, Calif. 90069

[21] Appl. No.: 935,066

[22] Filed: Aug. 18, 1978

Related U.S. Application Data

[63] Continuation-in-part of Ser. No. 808,552, Jun. 21, 1977, abandoned.

[51] Int. Cl.² ............................................... H05B 1/02
[52] U.S. Cl. ...................................... 219/497; 323/34; 219/492; 219/508; 219/501
[58] Field of Search .................. 323/22 SC, 20, 19, 24, 323/34, 75 A; 307/252 UA; 219/497, 494, 501, 492, 508

[56] References Cited

U.S. PATENT DOCUMENTS

| | | | |
|---|---|---|---|
| 3,719,858 | 3/1973 | Gilbreath | 323/22 SC |
| 3,818,320 | 6/1974 | Schindler | 323/20 |
| 3,858,027 | 12/1974 | Phillips | 219/492 |
| 3,878,358 | 4/1975 | Barton et al. | 219/505 |
| 3,943,331 | 3/1976 | Meijér | 219/494 |
| 3,946,200 | 3/1976 | Juodikis | 219/499 |
| 4,053,733 | 10/1977 | Murata et al. | 219/494 |
| 4,086,466 | 4/1978 | Scharlack | 219/501 |

Primary Examiner—B. A. Reynolds
Assistant Examiner—M. H. Paschall
Attorney, Agent, or Firm—John T. Matlago

[57] ABSTRACT

A temperature control circuit for a point-of-use water heater comprises a pulse charging circuit which includes a summing capacitor provided with a residual charge thereon at the beginning of each half cycle of an a.c. supply. The residual charge on the summing capacitor determines the pedestal charge on a timing capacitor and thereby the phase angle at which a ramp superposed on the pedestal fires a programmable unijunction transistor to provide a pulse for triggering switching means to supply a fraction of the a.c. supply to the heater each half cycle. The residual charge on the summing capacitor is determined each half cycle by the discharging thereof in accordance with a load current pulse feedback circuit and the output of a comparing circuit which compares the actual temperature of the water flowing past the heater with a desired set temperature.

9 Claims, 3 Drawing Figures

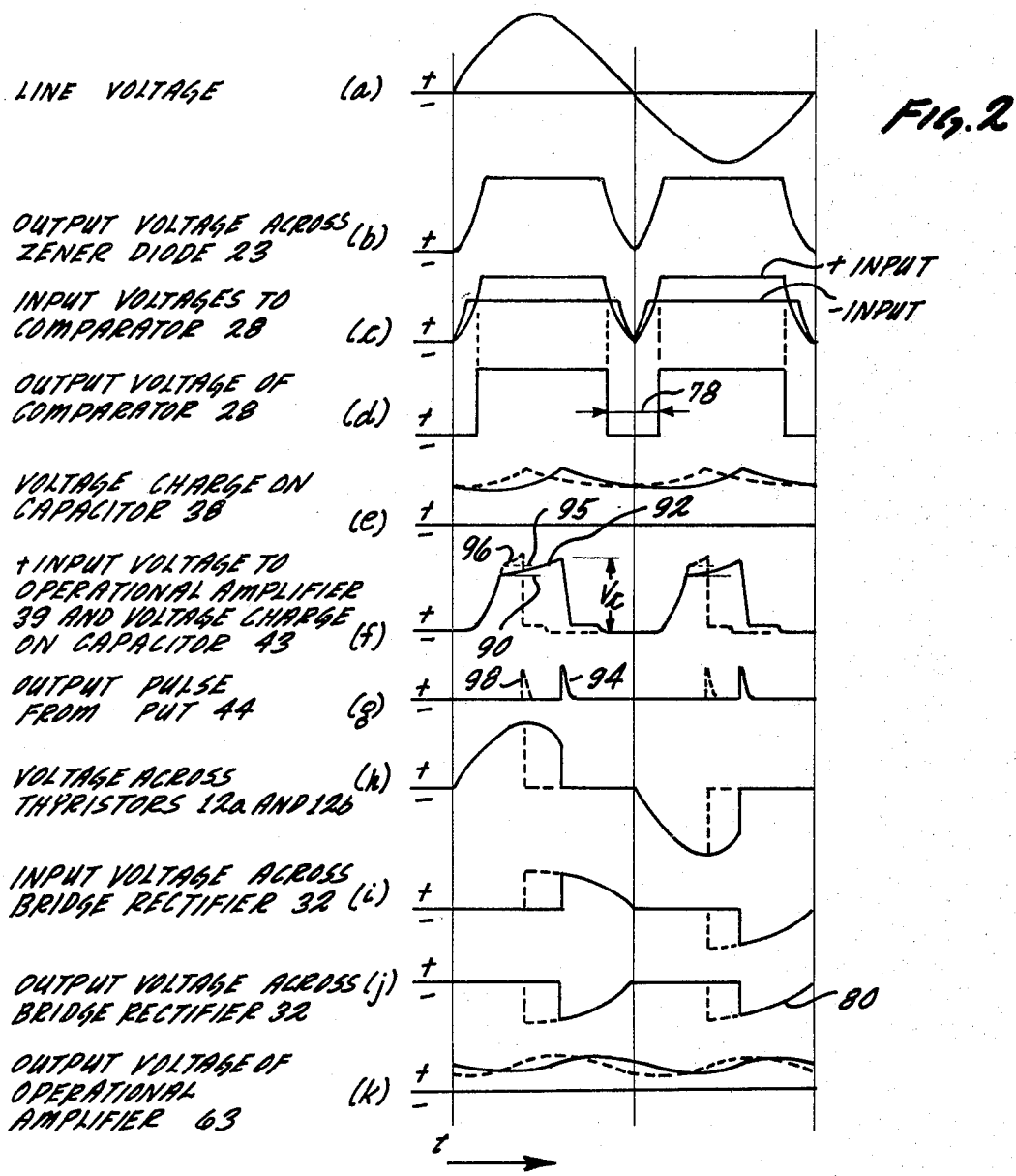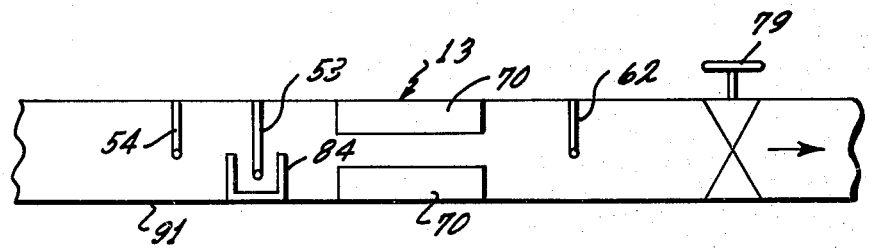

MULTIPLE VARIABLE PHASE CONTROL CIRCUIT

CROSS REFERENCE TO RELATED APPLICATION

This application is a continuation-in-part of copending application Ser. No. 808,552 filed June 21, 1977 and now abandoned.

BACKGROUND AND SUMMARY OF THE INVENTION

This invention relates to temperature control circuits and more particularly to an improved circuit for controlling the temperature of water flowing past a heater at its point-of-use.

Heating systems which provide for heating water at its point-of-use are of interest because of their small size and high efficiency. The temperature control circuits for such water heating systems operate by comparing the actual temperature of the water that has flowed past the heater with a set point and making a determination of the amount of current that must be supplied to the heater to maintain the set temperature of the flowing water.

In accordance with the present invention, a temperature control circuit for controlling power to a water heater located in the water line at the point-of-use of the water comprises a programmable unijunction transistor which converts an analog input signal to a phase controlled firing pulse each half cycle of an a.c. supply. The phase controlled firing pulse triggers switching means for supplying the a.c. supply to the heater for a controlled fraction of each half cycle.

More particularly, the temperature control circuit comprises a current charging circuit which includes a summing capacitor provided with a residual charge thereon at the beginning of each half cycle of the a.c. supply. The current charging circuit provides for charging a timing capacitor associated with the programmable unijunction transistor first to a pedestal level determined by the residual charge on the summing capacitor and then with a ramp. The ramp thus reaches the critical threshold voltage level of the programmable unijunction transistor causing it to fire at a phase angle of each half cycle which is dependent on the residual charge on the summing capacitor. The residual charge on the summing capacitor is controlled each half cycle by the discharging thereof in accordance with both a load current pulse feedback circuit and the output of a comparing circuit which compares the actual temperature of the water flowing past the heater with a desired set temperature.

These and other features and advantages of the present invention will appear more fully upon consideration of the specific illustrative embodiment shown in the accompanying drawings.

BRIEF DESCRIPTION OF THE DRAWINGS

FIG. 2 illustrates typical waveforms at various points of the circuit shown in FIG. 1; and FIG. 3 diagrammatically illustrates the heater and thermistors located in the water pipe line.

DESCRIPTION OF THE PREFERRED EMBODIMENT

Figure 1:
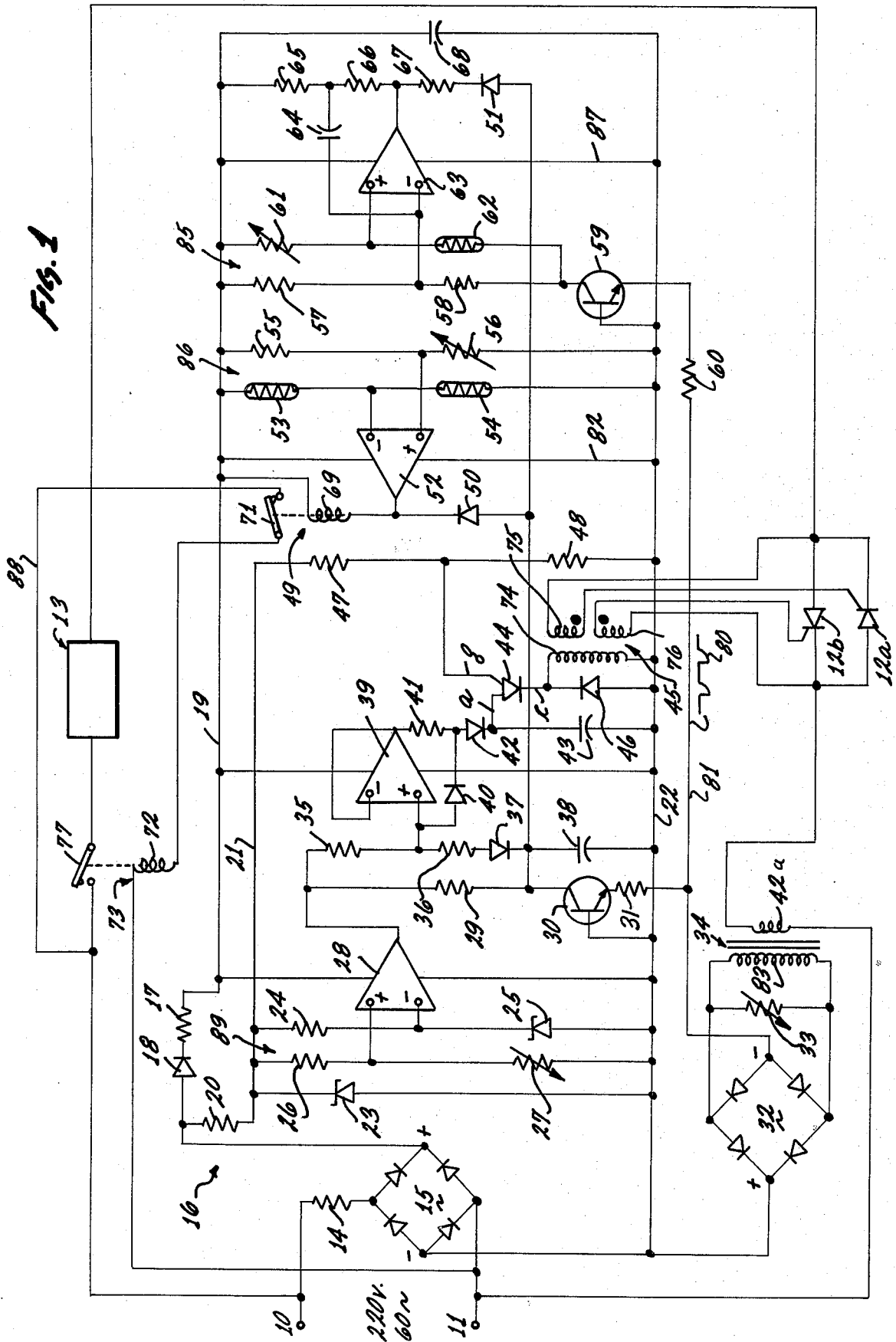
FIG. 1 is a schematic electrical diagram of the preferred embodiment of the temperature control circuit in accordance with the present invention.

Referring to FIG. 1, a 220 volt, 60 cycle, a.c. power supply, as shown in FIG. 2a, is connected across terminals 10 and 11 of a series circuit which includes a primary winding 42a of a current transformer 34, a pair of parallel connected oppositely poled thyristors 12a and 12b, a load 13 and a contact 77 of a normally open relay 73.

Also connected across terminals 10 and 11 is a temperature control circuit 16 in accordance with the present invention for controlling the switching of the pair of thyristors 12a and 12b to provide power to the load 13 each half cycle of the a.c. supply.

The a.c. wave supplied across terminals 10 and 11 passes through a limiting resistor 14 to a full wave diode bridge rectifier 15. The positive output of diode bridge rectifier 15 is connected through a resistor 20 to provide a d.c. supply line 21 and the negative output of diode bridge rectifier 15 is connected to provide a common return line 22. The positive output of diode bridge rectifier 15 is also connected through a diode 18 and a resistor 17 to provide an additional d.c. supply line 19. A zener diode 23 has its cathode connected to the d.c. supply line 21 and its anode connected to the common return line 22. Zener diode 23 clamps the peak voltage of the rectified wave to a predetermined level to provide trapezoidal pulses on d.c. supply line 21 as shown in FIG. 2b.

The temperature control circuit 16 includes a current charging circuit comprised of a comparator 28 having an input zener bridge 89. The zener bridge 89 comprises a first and second series path each connected from the d.c. supply line 21 to the common return line 22. The first series path includes a fixed resistor 26 and a variable resistor 27, and the second series path includes a fixed resistor 24 and a zener diode 25. The zener bridge 89 has the common junction of its resistors 26 and 27 connected to the positive input of comparator 28, and the common junction of its resistor 24 and zener diode 25 connected to the negative input of comparator 28.

The output of comparator 28 is connected through a series string comprising a resistor 35, a resistor 36, a diode 37 and a summing capacitor 38 to the common return line 22. A resistor 29 is connected from the output of the comparator 28 to the common junction of the diode 37 and the summing capacitor 38. The common junction of the resistor 35 and the resistor 36 in the series string is connected to the positive input of an operational amplifier 39. The output of operational amplifier 39 is directly coupled to its negative input to form a voltage follower.

The output of the operational amplifier 39 is connected through a series circuit including resistor 41, a diode 42 and a timing capacitor 43 to the common return line 22. The positive input of operational amplifier 39 is coupled to the anode of diode 42 by a diode 40.

A programmable unijunction transistor, hereinafter referred to as PUT 44, has its gate g coupled to the common point of series resistors 47 and 48 connected across the d.c. supply line 21 and the common return line 22. The anode a of PUT 44 is connected to the common junction of timing capacitor 43 and diode 42. The cathode c of PUT 44 is connected by a primary winding 74 of a pulse transformer 45 and a parallel diode 46 to the common return line 22. The secondary windings 75 and 76 of the pulse transformer 45 are coupled across the gate and cathode of the respective thyristors 12a and 12b.

The temperature control circuit 16 includes a temperature comparing circuit comprised of an operational amplifier 63 having an input resistor bridge 85. The input resistor bridge 85 comprises a first and second series path each connected from the d.c. supply line 19 to the collector of a n-p-n transistor 59. The first series path comprises resistors 57 and 58 and the second series path comprises a temperature setting resistor 61 and a temperature sensing thermistor 62. The common point of resistors 57 and 58 is connected to the negative input of operational amplifier 63 and the common point of setting resistor 61 and thermistor 62 is coupled to the positive input of operational amplifier 63. A series string comprising resistors 65, 66, 67 and a diode 51 is connected from the d.c. supply line 19 to the positive side of summing capacitor 38. The output of operational amplifier 63 is connected to the common point of resistors 66 and 67 and the common point of resistors 65 and 66 is connected through a capacitor 64 to the negative input of operational amplifier 63 to provide a negative voltage feedback.

The temperature control circuit 16 further includes the current transformer 34 having its primary winding 42a in the series load circuit coupled to a secondary winding 83 which is connected in parallel with a potentiometer 33 across the inputs of a diode bridge rectifier 32. The positive output of bridge rectifier 32 is connected to the common return line 22 and the negative output of diode bridge rectifier 32 is connected to a line 81 which is connected to the emitter of the n-p-n transistor 59 by way of a resistor 60. The base of transistor 59 is connected to the common return line 22.

The line 81 from the negative output of diode bridge rectifier 32 is also connected through resistor 31 to the emitter of an n-p-n transistor 30 whose collector is connected to the positive side of summing capacitor 38. The base of transistor 30 is connected to the common return line 22. The transistor 30 and resistor 31 thus provide a feedback circuit for summing capacitor 38.

The temperature control circuit 16 of the present invention further includes a water flow switching circuit comprised of a comparator 52 having an input bridge 86. The input bridge 86 is comprised of a first series path including resistors 55 and 56 and a second series path including thermistors 53 and 54. Each of these series paths is connected between the d.c. supply line 19 and the common return line 22. The positive and negative inputs of the comparator 52 are respectively coupled to the common output of the resistors 55 and 56 in the first series path and the common output of thermistors 53 and 54 in the second series path of the bridge circuit. The output of comparator 52 is connected through a diode 50 to the positive side of the summing capacitor 38 and is also coupled through a coil 69 of a normally closed relay 49 to the d.c. supply line 19. The relay 49 has one end of its normally closed contact 71 connected through the coil 72 of the relay 73 to the terminal 11 of the a.c. supply and the other end of its normally closed contact 71 connected through line 88 to the other terminal 10 of the a.c. supply.

Reference will next be made to FIG. 3 which diagrammatically illustrates a water pipe 91 provided with a heater in the form of a pair of graphite plates 70 corresponding to load 13 past which the water flows when valve 79 is opened. Located in the water pipe 91 are the two thermistors 54 and 53 of the flow control switch including comparator 52. The thermistor 54 is placed in the main stream of the water and the thermistor 53 is placed so as to be sheltered from the main stream by a baffle 84. Also shown in the main stream of the water is thermistor 62 of the temperature comparing circuit including operational amplifier 63 which senses the temperature of the water after it has been heated upon flowing past the conducting graphite plates 70 and compares it with the set temperature. The temperature of the water flowing out of valve 79 is controlled by adjusting resistor 61 to a desired temperature setting.

OPERATION

When the trapezoidal pulses provided by the zener diode 23, as shown in FIG. 2b, are supplied across the zener bridge 89, the voltage of the common junction of resistor 24 and the zener diode 25 is clamped at the breakdown voltage of the zener diode 25. This causes the waveform on the negative input to the comparator 28 to be of a lower potential then the waveform on the positive input thereof. As a result, the output of the comparator 28 switches to a high voltage level at the point where the respective rising input voltages cross and switches to a low voltage level at the point where the respective falling input voltages cross (FIG. 2d).

The advantage of using the comparator 28 with the zener bridge 89 is that the down time of the comparator 28 can be controlled by adjusting the resistor 27. In other words, adjusting resistor 27 will vary the slopes of the positive input waveform and thereby modify the points at which comparator 28 will turn on and off each cycle such as to control the interval of time 78 (FIG. 2d) during which the charging current is cutoff to give the PUt 44 a chance to recover.

It should be appreciated that as the frequency of operation of the PUT 44 and associated capacitor 43 goes up, one is working with shorter and shorter half cycles. So it is necessary to provide more off time for the PUT 44 to recover because such time is fairly independent of the operating frequency. It would be possible to make the circuit operate at a very high frequency by using a smaller capacitor 43, but then the discharge of such smaller capacitor would not provide a pulse sufficient to fire the thyristors 12a and 12b.

The output of comparator 28 when high in potential conducts through the voltage divider comprised of resistors 35 and 36 to charge the summing capacitor 38 (FIG. 2e). The common point of resistors 35 and 36 is connected to the positive input of the operational amplifier 39.

When comparator 28 turns on its output swings to a high potential causing current to flow through resistors 35 and 36 to start charging the summing capacitor 38 (FIG. 2e). This raises the potential at the common point of resistors 35 and 36 which is coupled to the positive input of operational amplifier 39. This causes operational amplifier 39 to conduct through resistor 41 and diode 42 to initially charge timing capacitor 43 to a pedestal level 90 and then more gradually with a ramp 92 (FIG. 2f). If too much current should flow through resistor 41, the drop across resistor 41 causes diode 40 to conduct and so some of the current instead of making the positive input to operational amplifier 39 more positive in potential will bypass the operational amplifier 39.

It should now be clear that the bias on the gate electrode g of the PUT 44 as determined by resistors 47 and 48 is such that the initial charge or pedestal charge on the timing capacitor 43 alone will not be sufficient to trigger the PUT 44. Thus, as a result of summing capacitor 38 continuing to being charged by the output of comparator 28, the timing capacitor 43 likewise continues to be charged with a ramp voltage following its initial charge until the voltage across it exceeds the bias, i.e. the threshold level Vc, of the PUT 44. At this point the PUT 44 becomes conductive and the timing capacitor 43 is very quickly discharged by way of the primary winding 74 of the pulse transformer 45. The pulse produced by the sudden flow of the capacitor 43 discharges current through the secondary windings 75 and 76 which triggers on the appropriate one of the thyristors 12a and 12b during each half cycle. Since the thyristor is a latching device it continues to be turned on for the remainder of the half cycle.

The larger the residual charge on summing capacitor 38 at the beginning of each half cycle, the higher the pedestal on timing capacitor 43 and the sooner the ramp thereon reaches the critical threshold voltage Vc. Thus the sooner the PUT 44 fires each half cycle causing the appropriate one of the thyristors 12a and 12b to be switched on and the greater is the fraction of each half cycle during which current flows through the graphite heater plates 70 of the heater to heat the water flowing therepast.

Initially, when the a.c. supply is applied to the terminals 11 and 12, and while the water flow is turned off by use of valve 79, the output of the comparator 52 is relatively low in potential and the summing capacitor 38 is kept discharged by current flowing through the line including diode 50 to the output of comparator 52 and through the return line 82 of the comparator 52 to the common return line 22. Under these conditions current also simultaneously flows from d.c. supply line 19 through the coil 69 of normally closed relay 49 to the output of comparator 52 and through return line 82 to the common return line 22 and thereby holds the normally closed relay 49 open. Consequently, the circuit connecting power to coil 72 of normally open relay 73 is broken and contact 77 of relay 73 is likewise initially open to assure that no heat can be supplied across the load 13.

It should be further noted that when the a.c. supply is initially applied to terminals 10 and 11, the thermistors 53 and 54 in the water pipe 91 at the point-of-use are both conducting slightly due to the fact that they are coupled in series across the d.c. supply line 19 and the common current return line 22 and therefore they are both slightly warm. It is because the bridge 86 including thermistors 53 and 54 is slightly imbalanced at this time that the output of operational amplifier 52 is relatively low in potential.

When water is first caused to flow in the pipe 91 by turning valve 79 on, the cold incoming water lowers the temperature of the thermistor 54 but not the thermistor 53 since the latter is being sheltered from the cold incoming water by the baffle 84. This produces an imbalance in the opposite direction of the bridge 86 connected to the inputs of comparator 52. This causes the output of the comparator 52 to switch to a more positive potential thus terminating the discharging of the summing capacitor 38 and likewise terminating the current flowing through the coil 69 of relay 49 such that the latter closes. This causes the coil 72 of relay 73 to be energized thus closing its contact 77 and enables power supplied by thyristors 12a and 12b to be applied across the graphite heater plates 70 corresponding to load 13.

It should be noted that since summing capacitor 38 is being discharged when the water is not flowing, when the valve 79 is first opened and water starts to flow in pipe 91, it will only be gradually heated up to the set temperature. This is known in the art as a soft start.

When the valve 79 is again turned to its off position to stop the flow in the pipe 91, the thermistors 53 and 54 no longer sense a difference in temperature. This causes the output of comparator 52 to again switch to a lower potential which again serves to discharge the summing capacitor 38 and to again conduct current through relay coil 69 to thereby open relay 49 and therefore the relay 73 which connects the load 13 to the return side of the a.c. supply.

To control the temperature of the water flowing out of the pipe 91 when the valve 79 is opened, the setting resistor 61 in bridge 85 is set to correspond to a desired temperature setting of the flowing water, for example 112 degrees F. Then, depending on the lower temperature of the water initially flowing past thermistor 62 in pipe 91, the outputs of the bridge 85 as applied to the inputs of operational amplifier 63 are imbalanced. This causes the output of operational amplifier 63 to be more positive in potential thereby lessening the discharge of summing capacitor 38 through diode 51, resistor 67, and through the return line 87 of operational amplifier 63 to the common return line 22. This lessening of the discharge of summing capacitor 38 results in a higher pedestal voltage on timing capacitor 43, such that when the ramp voltage is superimposed thereon the PUT 44 fires earlier in the half cycle to thereby cause the thyristors 12a and 12b to fire earlier. Thus, a larger amount of current is initially supplied through the thyristors 12a and 12b to the graphite plates 70 as required to heat the cold incoming water to the desired temperature as indicated by setting resistor 61. When the heated water flowing out of the water pipe 91 through valve 79, as indicated by the sensing thermistor 62, reaches the temperature of the setting resistor 61, the outputs of bridge 85 as applied to the inputs of operational amplifier 63 tend to be balanced. This causes the output of operational amplifier 63 to be less positive in potential thereby increasing the discharge of summing capacitor 38. Under these conditions, the residual charge on the summing capacitor 38 at the beginning of each half cycle tends to be the same and therefore the firing angle of the PUT 44 tends to reach a stable point.

Each time one of the thyristors 12a and 12b switches to supply the a.c. supply to the load 13, the primary winding 42a of the current transformer 34 senses the a.c. current pulse flow through the thyristors 12a and 12b and produces corresponding current pulses across a secondary winding 83 thereof. These current pulses (FIG. 2i) are full wave rectified by the diode bridge rectifier 32 so that the pulses appearing on the line 81 connected to the negative output are of negative polarity (FIG. 2j). Thus there appears on line 81 a continuous succession of negative going current pulses 80 corresponding to the pulses passed by the switching thyristors 12a and 12b.

It should be noted that the output of operational amplifier 63 is coupled through resistor 66 and capacitor 64 to the negative input of the operational amplifier 63. This operates as a negative voltage feedback in that any change on the negative input to operational amplifier 63 tends to be minimized so that when the transistor 59 conducts only the series path comprised of resistor 61 and thermistor 62 is affected by the negative current feedback. It should be appreciated that the conduction through transistor 59 would have no affect on the inputs to operational amplifier 63 if the capacitor 64 were not present. In other words, without capacitor 64 both series paths of the bridge 85 would go up and down equally so that there would be no current feedback. Thus the capacitor 64 is being used for both negative voltage and negative current feedback in that it provides the time constant for both types of feedback as desired for stabilizing the circuit.

It should now be clearly understood that during the conductive time of the switching thyristors 12a and 12b each half cycle, the emitter of transistor 59 is lowered in potential such that current passing through the series paths of bridge 85 flows through transistor 59. This tends to minimize the difference in potential on the positive and negative inputs of operational amplifier 63. This, in turn, causes the output of operational amplifier 63 to become more negative in potential such as to tend to increase the amount of current discharged from the summing capacitor 38 through the diode 51, resistor 67 and through the return line 87 of the operational amplifier 63 to the common return line 22.

During the conductive time of the switching thyristors 12a and 12b during each half cycle, the negative going current pulse 80 appearing on line 81 further causes transistor 30 to conduct so as to discharge summing capacitor 38 during the latter portion of each half cycle.

It should now be clearly understood that the summing capacitor 38 is charged through resistors 36 and 29 by comparator 28 during a first portion of each half cycle of the a.c. supply and discharged during a latter portion of each half cycle through transistor 30 by the presence of the negative going pulse 80 on line 81. The charge on summing capacitor 38 is further modified in accordance with the wavering potential on the output of operational amplifier 63. The net effect of this charging and discharging leaves a residual charge on the summing capacitor 38 at the beginning of each half cycle which determines the pedestal level 90 of the charge on timing capacitor 43 each half cycle such that the instant the ramp 92 superposed thereon reaches the threshold level Vc the timing capacitor 43 will be discharged by the PUT 44.

It should be especially noted that the discharging of the summing capacitor 38 tends to be primarily by way of transistor 30 and only a small amount by way of operational amplifier 63 when the PUT 44 fires early in the half cycle. Likewise, the discharging of summing capacitor 38 tends to be primarily by way of operational amplifier 63 and only a small amount by way of transistor 30 when the PUT 44 fires later in the half cycle. This is because the negative going pulses on line 81 are larger when the PUT 44 fires early in the half cycle and smaller when the PUT 44 fires later in the half cycle.

The maintaining of a residual charge or voltage on the summing capacitor 38 at the beginning of each half cycle to keep the operation at a stable point is a matter of selecting proper circuit values for the potentiometer 33, the resistor 31 and the proper turns ratio on the primary and secondary windings of pulse transformer 34 and these values need to be such that a reasonable voltage is maintained on the summing capacitor 38 at any given operating point of a half cycle.

If the water flow rate is suddenly increased by opening up valve 79 with the setting resistor 61 remaining set at 112 degrees F., for example, the temperature of the water flowing out of the valve 79 initially drops causing the temperature as sensed by the thermistor 62 to drop. This initially creates a greater potential difference at the inputs to operational amplifier 63 which causes its output potential to rise so that less current is discharged from the summing capacitor 38. This increases the residual charge on summing capacitor 38 and increases the pedestal voltage 95 such the ramp 96 thereon, shown in dotted lines in FIG. 2f, reaches the threshold firing level Vc sooner and causes the firing pulse of the PUT 44 to move to another stable point to the left as indicated by the pulse 98 shown in dotted lines in FIG. 2g. This causes a greater amount of current to be supplied to the graphite plates 70 each half cycle as needed to heat the greater quantity of flowing water to the set temperature.

It should be further noted that the transistor 30 and resistor 31 further serve to limit the average load current to a predetermined value of 70 amperes, for example. By average value is meant the average value of the current supplied to a load over several half cycles.

It should now be understood that for any given water flow rate in the pipe 91, as controlled by valve 79, a certain amount of current must be fed by the thyristors 12a and 12b to conduct from one graphite plate 70 through the water to the other graphite plate 70 to thereby heat the water to the temperature set by the setting resistor 61. However, if the operational amplifier 63 which compares the actual temperature of the heated water with the set point tries to maintain the charge on the summing capacitor 38 to provide an average current of above a predetermined set value of 70 amperes, for example, the large negative going pulse 80 on line 81 causes the transistor 30 to discharge the summing capacitor 38 more than it is charged by the output of comparator 28 each half cycle and thereby limits the current to the maximum average value of 70 amperes. So then, under these conditions, if the flow rate of the water is increased by further opening valve 79 the current remains the same and the temperature of the water necessarily drops. If the flow rate of the water is then decreased to a point where less then 70 amperes is again needed to heat the water to the set temperature, the current will then decrease as needed to just heat the water to the set temperature. It should now be clear that the temperature control circuit 16 of the present invention can operate either in a constant temperature mode or in a constant load current mode i.e. a load current limiting mode. However, the normal operation is to operate in the constant temperature mode.

While the invention has been illustrated and described in detail in the drawings and foregoing description, the same is to be considered as illustrative and not restrictive in character, it being understood that only the preferred embodiment has been shown and described and all changes and modifications that come within the spirit of the invention are also desired to be protected.

What is claimed is:

1. A temperature control circuit for switching an alternating current for a controlled fraction of each half cycle to a water heater comprising:
a current charging circuit means including a summing capacitor which is charged thereby each half cycle;
a unijunction transistor having a threshold firing level;
a timing capacitor associated with said unijunction transistor;

a feedback circuit means coupled to sense the fraction of the alternating current supplied to the heater each half cycle and discharging said summing capacitor each half cycle in accordance therewith; and a temperature comparing circuit means for comparing the temperature of the water heater with a desired set temperature and providing an output for further discharging said summing capacitor each half cycle as a function of the temperature difference;

said current charging circuit means providing for initially charging said timing capacitor each half cycle to a pedestal voltage level dependent on the residual charge on said summing capacitor and thereafter along a ramp whereby the phase angle at which the ramp reaches the threshold firing level of said unijunction transistor can be made to vary in accordance with the residual charge on said summing capacitor to thereby control the fraction of each half cycle that the alternating current is switched to the heater.

2. The invention in accordance with claim 1 wherein said feedback circuit means includes a current transformer for providing a current pulse corresponding to the fraction of the alternating current supplied to the water heater each half cycle and a bridge rectifier for providing a negative going feedback pulse in accordance therewith for discharging said summing capacitor each half cycle.

3. The invention in accordance with claim 1 wherein said current charging circuit means includes a comparator circuit having positive and negative inputs and an input bridge including a first series path comprised of a first and second resistor having their common junction connected to the positive input of said comparator circuit and a second series path comprised of a resistor and a zener diode having their common junction connected to the negative input of said comparator circuit.

4. The invention in accordance with claim 3 wherein said second resistor can be adjusted to thereby control the point at which said comparator circuit switches on and off each half cycle.

5. The invention in accordance with claim 1 wherein said temperature comparing circuit means includes a differential amplifier having an input bridge including a first series path comprised of a first and second resistor having their common junction connected to the negative input of said differential amplifier and a second series path comprised of a setting resistor and a thermistor having their common junction connected to the positive input of said differential amplifier, said setting resistor being settable to the desired temperature of said water and said thermistor sensing the temperature of the heated water.

6. The invention in accordance with claim 5 including a capacitor for coupling the output of said differential amplifier to the negative input thereof to provide a negative voltage feedback for said temperature comparing circuit means and including transistor circuit means responsive to a negative going feedback pulse provided by said bridge rectifier for lowering the potential on the return end of said series path each half cycle to increase the current flow therethrough and thereby provide a negative current feedback for said temperature comparing circuit means.

7. The invention in accordance with claim 1 including a water line flow sensing switch circuit means which operates to discharge said summing capacitor and open the load circuit when water is not flowing in said line.

8. The invention in accordance with claim 1 wherein said feedback circuit means operates to limit the maximum average fraction of alternating current that is switched to the water heater each half cycle.

9. The invention in accordance with claim 1 wherein said water heater is a point-of-use water heater.

* * * * *